Feb. 3, 1970 R. A. JENTZSCH 3,492,754

DENSE FLEXIBLE PLASTIC JACKET FOR LEAD HEADED JIG

Filed Nov. 29, 1968

Richard A. Jentzsch
INVENTOR.

United States Patent Office 3,492,754
Patented Feb. 3, 1970

3,492,754
DENSE FLEXIBLE PLASTIC JACKET FOR LEAD HEADED JIG
Richard A. Jentzsch, 450 Bow Line Bend, Naples, Fla. 33940
Filed Nov. 29, 1968, Ser. No. 779,687
Int. Cl. A01k 85/00
U.S. Cl. 43—42.09      4 Claims

ABSTRACT OF THE DISCLOSURE

A lead headed jig comprising a head and a reduced neck portion with a fish hook embedded therein having an eye extending outwardly therefrom, and a dense flexible plastic jacket mounted on the jig conforming in shape to the jig and fitting snugly thereon. The jacket has a slit shorter in length than the overall length of the jig but long enough to include the fish hook eye extending therethrough. The jacket does not adhere to the jig and is easily removed therefrom.

---

My invention relates to cast lead headed jigs or sinkers. I have found it very convenient to change the color of a jig to attract fish. In the past this has been done by dipping the jigs in various colored solutions and then waiting for them to dry or set.

To avoid having to wait for them to dry or set, it is an object of the invention to provide a slitted jacket which can be slid over the jig or sinker and be bound in position. Jackets can be made of a dense flexible plastic material in many different colors. Dense flexible plastic jackets do not adhere to said lead headed jigs.

Figure 1:
Figure 2:
Figure 3:
Figure 4:
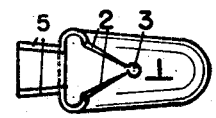
Figure 5:
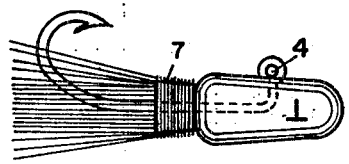

Further objects will be apparent from the following description when considered in connection with the accompanying drawing in which;

FIG. 1 is a side view showing a cast lead headed jig,

FIG. 2 is a side view of the jacket with the hollow inside shown in dashed lines, FIG. 3 is a top view of FIG. 2 showing the slit in the jacket and the hole for the eye of the fish hook, FIG. 4 is a top view of the jacket opened and ready for sliding onto the jig of FIG. 1, and, FIG. 5 is a side elevation of the jacket assembled on the jig with winding to hold it firmly in position outside the surface of the neck.

Referring to the various figures of the drawing, FIG. 1 shows a fish hook having an eyelet 4 which is embedded in a lead sinker having a head and a neck portion 6 with the eyelet 4 extending upwardly from the head of the sinker. This lead sinker is provided with a slitted jacket 1 as shown in FIG. 2 which likewise has a neck portion 5 tapered to fit over the neck portion 6 of the sinker and with a larger portion shaped to fit over the head of the sinker. There is a partial hole 3 in the jacket and the eye 4 of the fish hook will extend through the hole 3. FIG. 3 shows the jacket having a slit 2 extending through the neck portion 5 and terminating at the hole 3. FIG. 4 shows the jacket which is composed of a flexible plastic material as opened up at slit 2 so that the entire jacket can be slid onto the sinker to fit snugly thereon. FIG. 5 shows the complete device in which a winding 7 is wrapped around the neck portion after the jacket is mounted on the sinker in order to hold the jacket 1 firmly in position as well as to secure bucktail or nylon hairs to the assembly.

I claim:

1. A lead headed jig having a head and a reduced neck section, a fish hook embedded therein with a hook eye extending above the surface of the jig head for attaching a fishing line thereto, a dense flexible plastic jacket mounted on said jig which does not adhere thereto, said jacket comprising a body portion integral with an open neck portion conforming in shape to the jig head and neck section, said body and neck portions having a longitudinal slit shorter than the combined lengths of said body and neck portions and just long enough to include the said eye of the fish hook extending therethrough, said jacket being capable of being spread apart and opened at the body and neck portions which include said slit so that said jacket can be slipped on to or off of said lead headed jig and fit snugly around said jig when in position on said jig.

2. The combination claimed in claim 1 having threads or windings around said neck portion to hold said jacket in position.

3. The combination claimed in claim 1 in which said jacket can be made in different colors.

4. The combination claimed in claim 1 including bucktail or hairs around the neck portion and held in position by threads or windings.

References Cited

UNITED STATES PATENTS

| | | | |
|---|---|---|---|
| 1,599,763 | 9/1926 | Head | 43—42.09 |
| 2,315,304 | 3/1943 | Upperman | 43—42.37 X |
| 2,796,693 | 6/1957 | Gunterman | 43—42.09 |
| 3,169,336 | 2/1965 | Pope | 43—42.37 X |
| 3,289,345 | 12/1966 | Reininger et al. | 43—42.09 |
| 1,600,652 | 9/1926 | Steenstrup | 43—42.09 |
| 3,017,307 | 1/1962 | Halliburton | 43—44.81 X |

SAMUEL KOREN, Primary Examiner

DANIEL J. LEACH, Assistant Examiner

U.S. Cl. X.R.

43—42.28